M. ZETSCHOK & F. SEITZ.
STEAM GENERATOR.
APPLICATION FILED DEC. 17, 1910.

1,003,852.

Patented Sept. 19, 1911.
2 SHEETS—SHEET 1.

Inventors
Max Zetschok
Frederich Seitz.

By Victor J. Evans,
Attorney

Witnesses

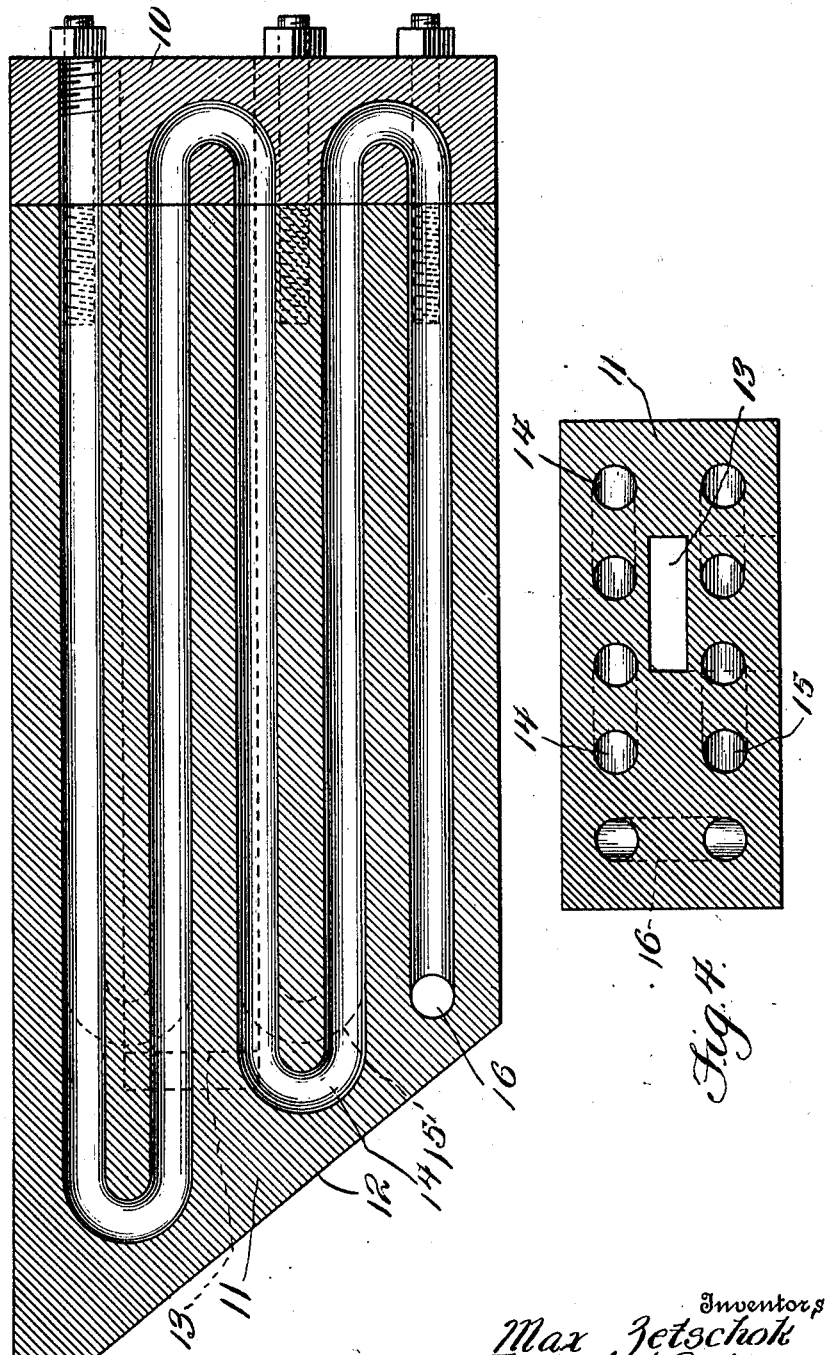

UNITED STATES PATENT OFFICE.

MAX ZETSCHOK AND FREDERICK SEITZ, OF SAN FRANCISCO, CALIFORNIA.

STEAM-GENERATOR.

1,003,852.  Specification of Letters Patent.  Patented Sept. 19, 1911.

Application filed December 17, 1910. Serial No. 597,836.

*To all whom it may concern:*

Be it known that we, MAX ZETSCHOK and FREDERICK SEITZ, citizens of the United States, residing at San Francisco, in the county of San Francisco and State of California, have invented new and useful Improvements in Steam-Generators, of which the following is a specification.

The invention relates to a steam generator, and more particularly to the class of steam generators especially adapted for use in baking ovens.

The primary object of the invention is the provision of a generator in which the waste vapors from the gas flame used for lighting a baking oven and also the heat radiated from the walls of the oven may be utilized for heating of coils for the production or generation of steam to be introduced into the oven.

Another object of the invention is the provision of a steam generator in which the generating coils thereof may be readily opened for the purpose of cleaning the same, and that will convert water into steam for the utilization thereof by the baking oven, the steam coils being heated from the gas flame ordinarily used in lighting the oven, and the heat from the walls of said baking oven.

A further object of the invention is the provision of a steam generator of this character which may be readily and conveniently mounted within the light passage of a baking oven and that is simple of construction, reliable and efficient in operation, and inexpensive in manufacture.

With these and other objects in view, the invention consists in the construction, combination and arrangement of parts, as will be hereinafter more fully described, illustrated in the accompanying drawings, and pointed out in the claims hereunto appended.

Figure 1:
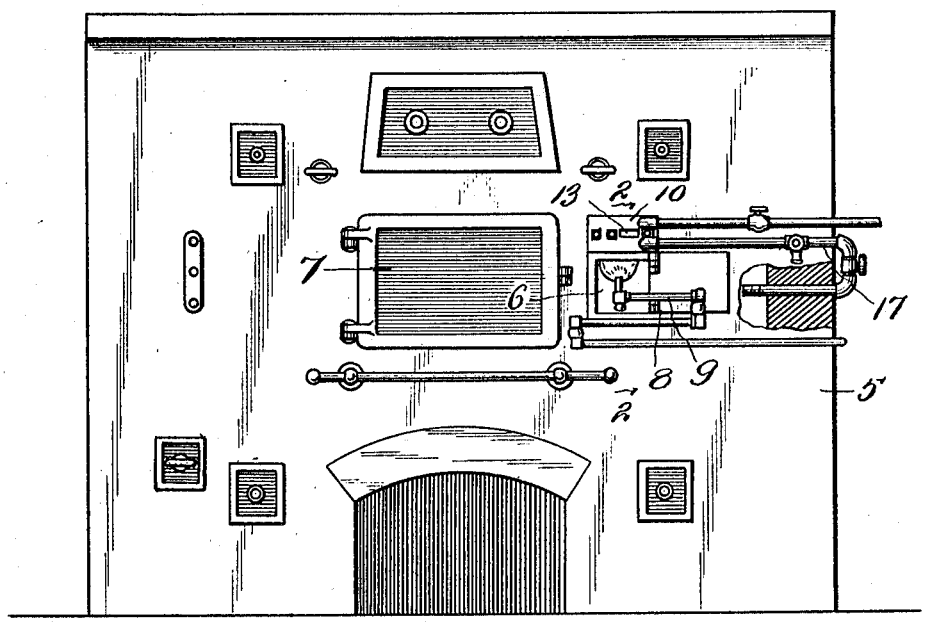
Figure 2:
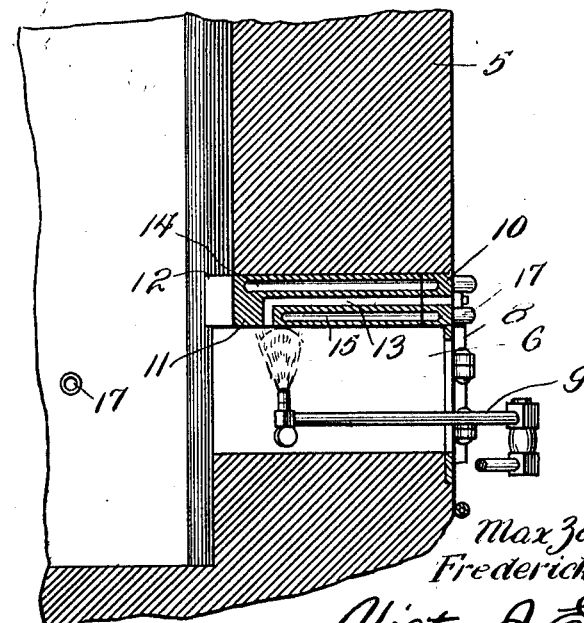

In the drawings: Figure 1 is a front elevation of a baking oven of the ordinary construction, showing the generator constructed in accordance with the invention mounted therein, the oven being partly broken away at its front wall. Fig. 2 is a vertical sectional view on the line 2—2 of Fig. 1. Fig. 3 is a horizontal transverse sectional view through the generator, the same being detached from the oven. Fig. 4 is a vertical longitudinal sectional view through the said generator.

Similar reference characters indicate corresponding parts throughout the several views of the drawings.

Referring to the drawings by numerals, the baking oven comprises a wall structure forming a casing 5, within which is provided the usual heating oven for the reception of substances to be baked, and through the front wall of the said structure and opening into the oven therein, is formed a lighting chamber or cell 6, the said heating oven being closed by a hinged front door 7, while the lighting chamber or cell 6 is normally closed by a suitable door 8. It is of course to be understood that the baking oven may be of any desirable or well-known construction, although preferably made from brick masonry. Suitably mounted within the lighting chamber or cell 6 is a gas burner 9, and embedded in the front wall of the baking oven structure is a steam generator, comprising metallic blocks 10 and 11, the block 10 being of considerably less area than the block 11, but both blocks are of like thickness and width and block 11 is provided with inner beveled edges 12, so as to lie flush with the inner face of the front wall.

Formed centrally within the blocks 10 and 11 is a flame passage or conduit 13, the same being substantially the length of the generator and has one end opening through the bottom of the block 11, while its opposite end opens through one end of the block 10, so that the wasted vapors of the gas flames within the light compartment or chamber 6 may enter one end of the passage or conduit 13 and traverse therethrough to the other end thereof for its discharge therefrom. The wasted vapors of the gas flame when passing through the conduit or passage 13 will heat the blocks 10 and 11 for a purpose as will be hereinafter more fully described.

Disposed within the blocks 10 and 11 above and below the plane of the flame conduit or passage 13 are sinuous steam channels 14 and 15, the same being in communication with each other through the medium of a channel 16, the free end of the channel 14 being connected with any suitable inlet water supply pipe (not shown), while the free end of the channel 15 has connection with a steam delivery pipe 17 leading into the heating oven within the casing 5 so that the steam generated within the channels 14 and 15 may be conveyed into the said oven for baking purposes. The heat radiated from the walls of the casing 5 will serve to heat the blocks 10 and 11 and also the gas flame within the light chamber 6 when passing through the flame passage or conduit 13 in the said block will distribute heat thereto so that the water fed into the generating channels 14 and 15 will be converted into steam for utilization within the oven during the operation of the baking oven. Thus it will be seen that the generator requires only the fuel spent within the baking oven for its working, thereby minimizing the cost of operation. It is obvious that on detaching the block 10 from the block 11 of the generator, access may be had to the interior of the channels 14 and 15, whereby the same may be readily and conveniently cleaned.

What is claimed is:

1. A steam generator of the class described, comprising a block having upper and lower sinuous channels therein communicating with each other, said block being provided with a heat passage disposed between the sinuous channels and opening through the opposite faces thereof, means for supplying water to the vents, and means for conveying steam from the said channels to an oven.

2. The combination with a baking oven, of a generator comprising a split block having a sinuous channel therein, said block being provided with a heat passage therethrough, a water supply pipe leading to said channel, and means for conveying steam from the channel to the said oven.

In testimony whereof we affix our signatures in presence of two witnesses.

MAX ZETSCHOK.
FREDERICK SEITZ.

Witnesses:
JACK BUNACHER,
MARGUERITE COTTLE.

---

Copies of this patent may be obtained for five cents each, by addressing the "Commissioner of Patents, Washington, D. C."